May 5, 1931.   C. P DUBBS   1,803,962
PROCESS FOR CONVERTING HYDROCARBON OILS
Original Filed June 1, 1925
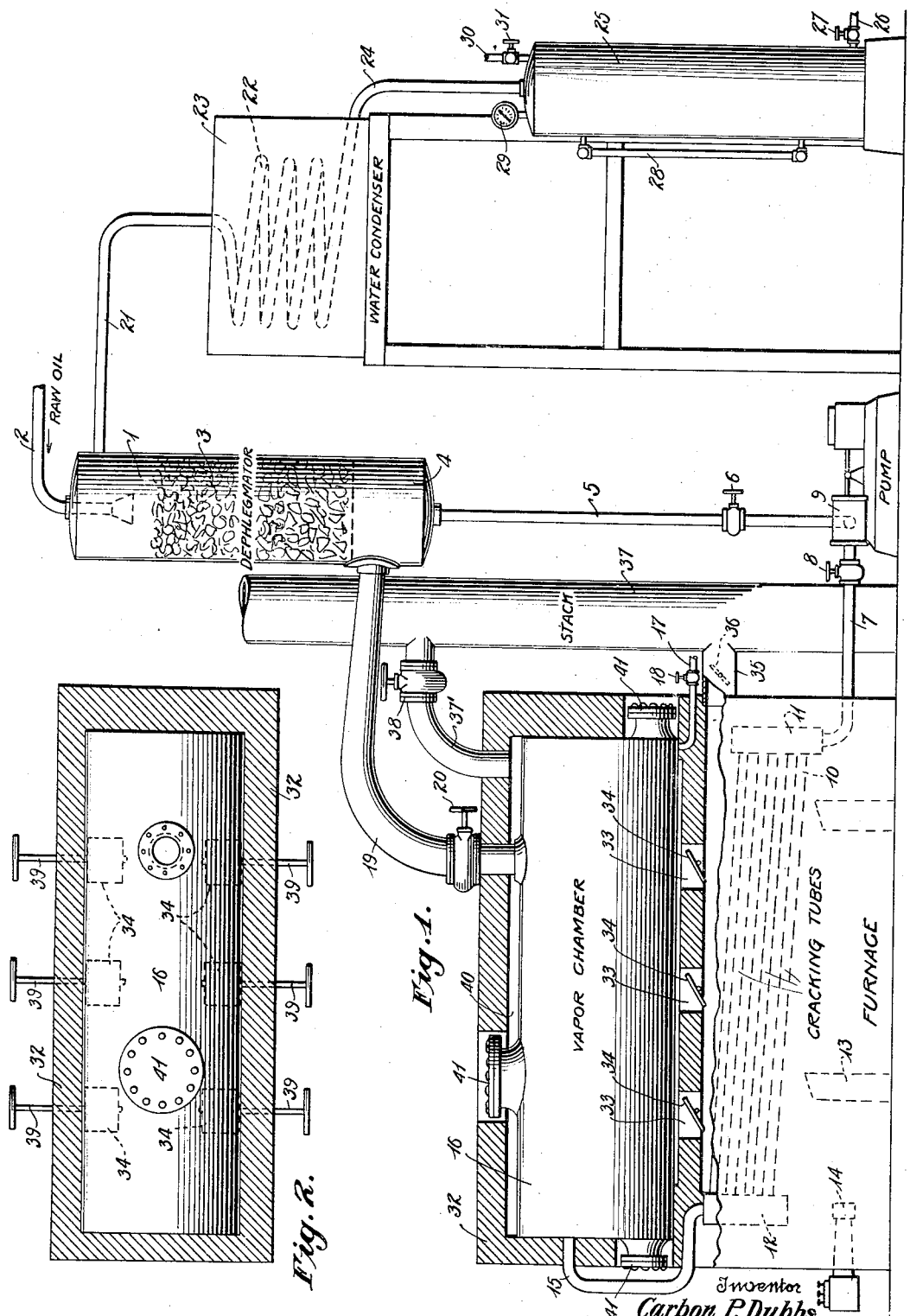

Patented May 5, 1931

1,803,962

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

PROCESS FOR CONVERTING HYDROCARBON OILS

Application filed June 1, 1925. Serial No. 34,132.

This invention relates to a process for converting heavy hydrocarbons into lighter or lower boiling point hydrocarbons, such as gasoline, and refers more particularly to a continuous process in which only a small quantity of residual oil is formed during the operation of the process. This application is a continuation in part of my application Serial No. 403,078, filed August 12, 1920.

A salient object of the invention is the provision of a process by which a maximum quantity of pressure distillate can be obtained from the charging oil. This is accomplished by separating the oil into low boiling point distillate and a relatively small quantity of residual oil containing the major portion of the carbon content of the charging oil.

It is a further object of the invention to provide such a process which is continuous in operation and in which the temperature conditions can be accurately controlled to bring about the separation of the oil into distillate and a small volume of liquid residuum.

For simplicity of description my improved process will be described in connection with the apparatus disclosed in the accompanying drawings, in which:

Fig., 1 is a diagrammatic side elevation of the apparatus with parts shown in section.

Fig. 2 is a plan view of the vapor or reacting chamber.

Referring in detail to the drawings, the incoming charging oil is introduced into the top of the dephlegmator 1 through the inlet pipe 2 and is sprayed upon the comminuted material such as broken rock, small pieces of iron, porcelain or other material, which serves to finely divide the incoming charging oil, so that the oil vapors, which are rising through the dephlegmator counter current to the flow of the incoming oil will be exposed to a greater dephlegmating action. The charging oil and the reflux condensate separated from the vapors in the dephlegmator, collect in a pool indicated by the reference character 4 in the bottom of the dephlegmator. This mixed charging oil and reflux condensate is drawn off from the bottom of the dephlegmator through the line 5 controlled by the valve 6. The line 5 communicates with the pump 9 by which the charging oil and reflux condensate are forced through the inlet pipe 7, which is controlled by a valve 8 to the cracking tubes 10. These tubes are mounted between headers 11 and 12 and are positioned in the furnace 13 which is heated by means of gas burner 14. The oil after being raised to a cracking temperature in the tubes is directed from the header 12 through the transfer line 15 into the vapor or reaction chamber 16, where further reaction takes place, resulting in the release of the oil vapors and a simultaneous accumulation of a small quantity of liquid residuum. This liquid residuum is permitted to accumulate in the bottom of the chamber and may be continuously or intermittently removed therefrom.

During the operation of my improved process the oil is fed slowly through the cracking tubes so that at no time is there any considerable collection of liquid oil in the vapor or reaction chamber. For permitting the removal of the residuum from the chamber I provide a draw-off line 17, controlled by a suitable valve 18, the line 17 being tapped into the bottom of the vapor or reaction chamber 16, as shown.

The oil vapors evolved in the chamber 16 rise through the goose-neck 19 regulated by the valve 20 and are dephlegmated, as previously described. The uncondensed vapors pass from the top of the dephlegmator through the line 21 to the coil 22 positioned in the water condenser box 23. The condensable vapors are condensed in the coil 22 and the resulting distillate passes through line 24 together with uncondensable gas and is collected in the receiver 25 from where the distillate may be withdrawn through the draw-off line 26, regulated by valve 27. The receiver 25 is of conventional form being provided with a liquid level gauge 28, pressure gauge 29 and gas outlet pipe 30 controlled by valve 31 through the medium of which the pressure on the system is controlled.

It is to be noted that the chamber 16 is positioned within insulated walls 32 directly above the main portion of the furnace and that there are communicating ducts 33 which connect the furnace directly with the space surrounding the chamber. These ducts are provided with suitable dampers 34 which are arranged to provide a means for accurately regulating the amount of heating gases permitted to pass from the furnace into the space surrounding the chamber. The heating gases, which normally pass through the opening 35 controlled by damper 36 directly to the stack 37, can be diverted through the ducts 33 and caused to pass around the reaction chamber where they assist in further distillation of the oil constituents in the reaction chamber. These gases after passing around the reaction chamber are directed to the stack 37 through the connecting flue 37' controlled by a damper valve 38.

The hand wheels 39, shown in Fig. 2, furnish a means for regulating the dampers 34, whereby the amount of heating gases permitted to circulate about the reaction chamber can be definitely controlled. At the beginning of a run, a greater percentage of the heating gases will be required to be diverted to the space surrounding the reaction chamber in order to raise the oil constituents therein to the optimum temperature. By suitably controlling the temperature of the reaction chamber, the oil constituents therein can be separated into vapors and a relatively small quantity of liquid residuum, which will collect in the bottom of the chamber. As the accumulation of the residuum increases it can be withdrawn through the line 17 controlled by the valve 18. Plates 41 are provided for permitting access to the chamber when it is to be cleaned at the end of a run.

One of the novel features of my invention is the fact that at no time is there permitted to accumulate any substantial quantity of liquid at any one point in the process, the charging material being separated into but two substances, a low boiling point distillate and a relatively small quantity of carbon containing liquid residuum.

The following illustrative run may be given: Subjecting mid-continent gas oil of approximately 33° Baumé gravity to a temperature of from 830° to 880° F. in reducing the same by continued distillation 5 to 15% residuum is formed, 3 to 10% uncondensable gas and from 78 to 90% pressure distillate have a Baumé gravity ranging from 46° to 50°.

What I claim as my invention is:

A continuous process for cracking hydrocarbon oil, consisting in heating the oil to a cracking temperature in a heating zone, in delivering the highly heated oil to an enlarged vapor chamber, wherein substantial conversion occurs, in maintaining the oil in said vapor chamber at a temperature such that the oil constituents separate into vapors representing at least 80 per cent of the oil charged to the heating zone and a liquid residue by circulating controlled quantities of combustion gases from the heating zone about said vapor chamber, in subjecting such vapors to reflux condensation, in returning the reflux condensate to the heating zone for further treatment, and in maintaining a superatmospheric pressure on the oil undergoing treatment in the process.

CARBON P. DUBBS.